Jan. 26, 1954     A. F. LLANUSA     2,667,275
COMBINED HOISTING AND WEIGHING DEVICE
Filed Dec. 30, 1950     3 Sheets-Sheet 1

INVENTOR:
Avelino Fernandez Llanusa
BY Singer, Stern & Carlburg
ATTORNEYS

Jan. 26, 1954

A. F. LLANUSA 2,667,275

COMBINED HOISTING AND WEIGHING DEVICE

Filed Dec. 30, 1950

INVENTORS.
Avelino Fernandez Llanusa,
BY Singer, Stern & Carlberg,

ATTORNEYS.

Patented Jan. 26, 1954

2,667,275

UNITED STATES PATENT OFFICE 2,667,275

COMBINED HOISTING AND WEIGHING DEVICE

Avelino Fernández Llanusa, Manzanillo, Cuba

Application December 30, 1950, Serial No. 203,587

2 Claims. (Cl. 212—2)

This invention relates to combined hoisting and weighing devices particularly adapted for sugar cane, which have to register the weight of the load after the load has been hoisted from a field cart and before it has been transferred to a railway car.

The object of this invention is to provide an improvement in the hoisting devices at present known and used at sugar-cane field sidings, which so simplifies the construction and operation of hoisting devices that it will revolutionize the mechanical art of combined hoisting and weighing devices.

It is a well-known fact that the sugar cane hoisting devices which are at present known and which are provided with a mechanism for registering the weight of the hoisted load as the latter is being raised from a field cart, include an upper slide track portion for the truck carrying the hoisted load, which is disconnected from the rest of the slide track and is maintained in raised suspension by means of jibs secured to the slide track and connected through a powerful lever and a cable to the weighing mechanism positioned adjacent one lower end of the framework uprights supporting the upper slide track. The construction of a hoisting device with such a slide track portion disconnected from the rest of the slide track for its movement in connection with the weighing mechanism is rendered greatly complicated and expensive, and the handling of the truck carrying the hoisted load is rendered equally complicated by reason of the fact that it is absolutely necessary for the truck to remain on said movable track portion in order that the weighing mechanism may operate to register the weight of the hoisted load to be transferred from a field cart to a railway car.

This invention provides a combined hoisting and weighing device which fully eliminates the slide track portion in movable suspension and in connection with the weighing mechanism, to which end the upper slide track of the hoisting device is made of one piece, without any disconnected portion, and the movements of the truck when transferring the sugar-cane load in suspension and after it has discharged the load, are rendered completely automatic by gravity. In the former movement of the truck, the slight inclination of the upper track is utilized, and in the latter movement of the truck the gravitatory action of a weight connected through a cable to one end of the truck is utilized, whereby the system only requires a friction stop mechanism on top in order, when pressed, to hold the truck in the desired position, and when loosened, to allow the truck to freely move backwards automatically.

This arrangement affords the advantage that in any position of the truck carrying the hoisted load of sugar cane it will be possible that the weight of the load be registered on the scale as long as the sugar cane load is in suspension, which is attained by effecting the suspension of the hoisting frame carrying the hoisted load by means of a single cable whose ends are wound upon drums supported on the driving shaft being operated to raise the sugar cane load from a field cart and to descend it to a railway car, said suspension cable being bent at its middle portion to form a downward incidence angle upon it being passed across the eye of a shackle secured to the short arm of a lever transmitting the tensile stress on the load suspension cable to the lever of the weighing mechanism which is usually installed within a casing positioned on the ground adjacent the uprights at one end of the framework, whereupon as long as the sugar cane is being hoisted by the sliding truck, the load suspension cable is in tension thereby allowing the net weight of the load to register on the scale without complications of tares or otherwise, whereby this combined sugar cane hoisting and weighing device is more inexpensive to manufacture and simpler in operation than any other device of its kind heretofore known.

The invention is described with reference to the figures of the accompanying drawings, of which:

Fig. 4 is an elevational longitudinal vertical detailed sectional view of the casing enclosing the scale, showing the connection between the latter and the sole suspension cable used to support the load and which is guided by pulleys situated on the truck sliding on top of the hoisting device framework.

Figure 1:
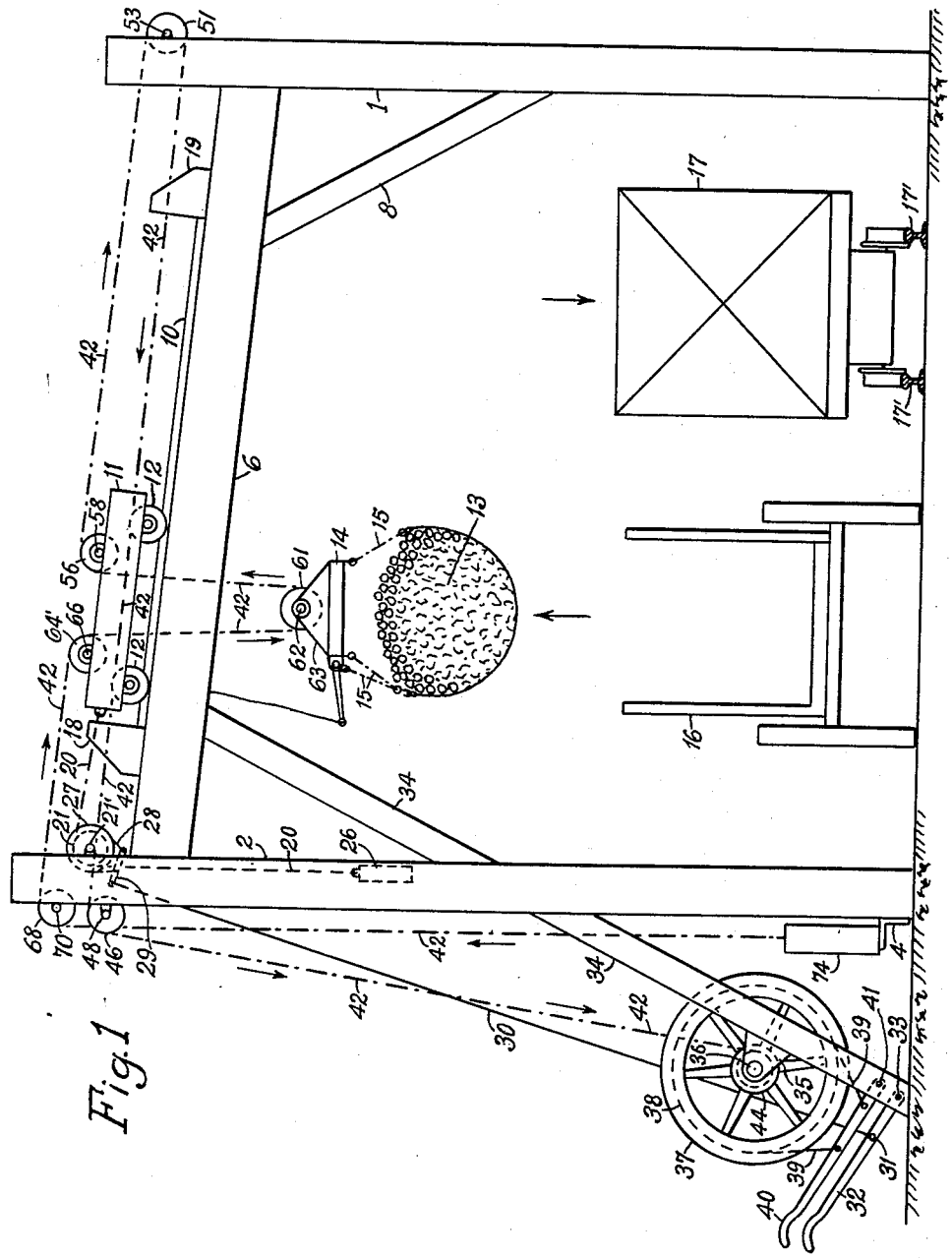
Fig. 1 is a front elevational view of the combined hoisting and weighing device of this invention.
Figure 2:
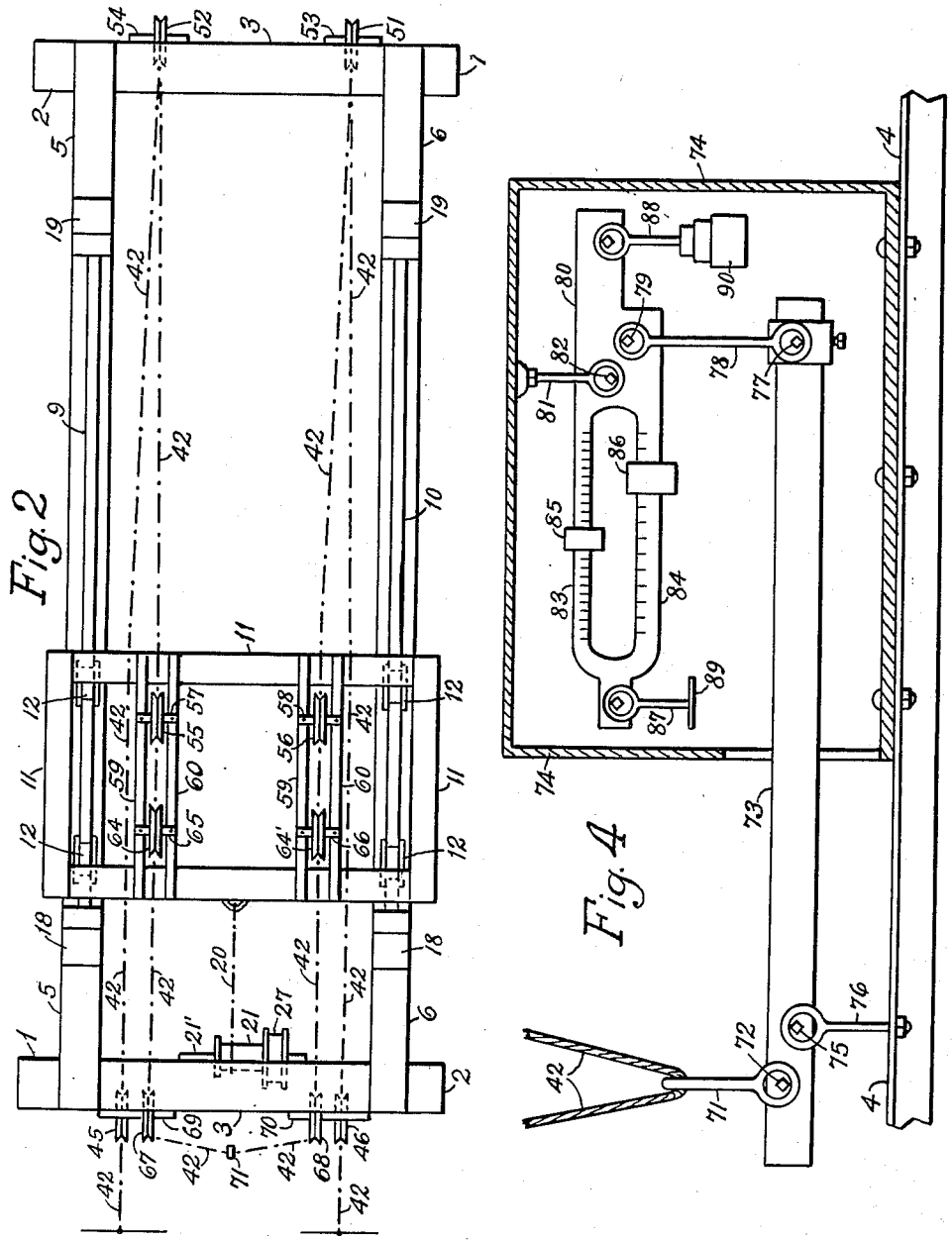
Fig. 2 is a top plan view of same.
Figure 3:
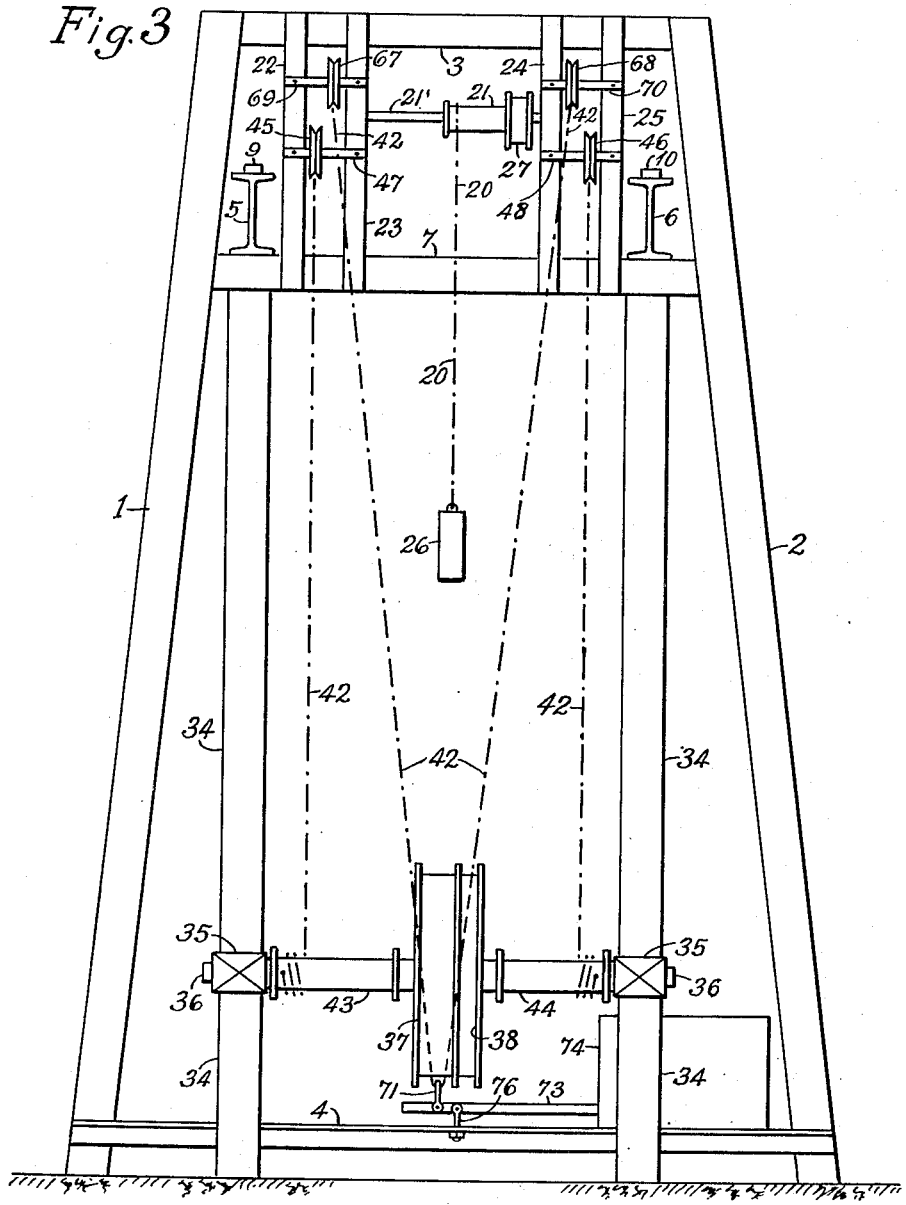
Fig. 3 is an end elevational view of same as viewed from the side at which both the driving mechanism for drawing the load suspension cable and the scale are situated.

Like similar devices of this kind, the hoisting device of this invention comprises a framework provided with two uprights, one at each end, each of which is composed of two grounded posts inclined towards each other 1 and 2, which may be made of wood or metal, and which at their upper ends are joined together by a bolster 3 and at their base ends are joined together by an angular bolster 4. Both end uprights are joined together at their upper ends by I-beams 5 and 6 spaced apart from each other and supported on bolsters 7 secured to the posts 1 and 2 of each end upright at a certain height beneath its upper ends equivalent to from one-third to one-fourth the height of said uprights, for the purpose of supporting tracks 9 and 10 adapted to slidably support thereon the truck 11 mounted through wheels 12 on said track.

The truck 11 is adapted to convey from one end to the other of the hoisting framework a sugar cane load 13 suspended from a frame 14 carrying slings 15 encircling the sugar cane load to be raised from a field cart 16 and transferred by truck 11 so that the load will be placed directly over the railway car 17 into which the load 13 is to be finally discharged. The framework is reinforced by two braces 8 joining together the posts 1 and 2 of the upright corresponding to the framework side at which the conventional railroad track 17' is laid, and the beams 5 and 6.

One of the features of this hoisting device is that the beams 5 and 6 supporting the slide track on which the truck 11 is adapted to run are slightly inclined at a 2° to 3° angle to form a downward slope from one end upright to the other, and the beams 5 and 6 have secured above same opposed stops 18 and 19 to limit the slidable movement of the truck, so that the truck carrying the sugar cane load 13 will automatically travel from the upper end of the track to the lower end thereof, when it be desired to have the load discharged over the railway car 17.

A further feature of this invention is that the truck 11 is connected at its upper end to a cable 20 wound about a drum 21 secured to a horizontal shaft 21' rotatorily mounted on journal bearings secured to the inner poles of two pairs of poles 22 and 23, 24 and 25, which are fixed to the upper bolster 3 and the intermediate bolster 7 included in the upright situated at the highest side of the slide track 5—6, the cable 20 ending in a weight 26 hanging therefrom.

The shaft 21' has secured adjacently the drum 21 a wide pulley 27 for a friction brake 28 connected to a lever 29 which is operated by a cable 30 connected at 31 to the hand lever 32, pivotally mounted on a horizontal pivot 33 supported on two spaced apart braces 34 fixed to the ground and secured at their upper end to the beams 5 and 6 supporting the slide track. The braces 34 have secured thereto journal bearings 35 that rotatorily support the horizontal shaft 36 having fastened to its central portion the vertical wheel 37 for the application of animal or mechanical power for raising the sugar cane load 13 from the cart 16 and discharging same over the railway car 17, said wheel having a channeled portion 38 for the friction brake 39 whose ends are connected to a second hand lever 40 pivotally mounted, similarly as lever 32, on a second horizontal pivot 41 secured to the braces 34.

The third and most important feature of this hoisting device is that the suspension of the frame 14 adapted to carry the sugar cane load 13 is effected by means of a single cable 42 the ends of which are wound about two drums 43 and 44 keyed to the driving shaft 36 at each side of the driving wheel 37, and from the drums 43 and 44 the two end portions of the cable 42 extend upwardly to be guided over two ball-bearing pulleys 45 and 46 rotatorily mounted on horizontal shafts 47 and 48 respectively supported on the two pairs of vertical poles 22 and 23, 24 and 25; then the two end portions of the cable 42 extend in a slightly inclined direction, and then across the frame of the movable truck to the opposed upright corresponding to the lowest end of the beams 5—6 whereat said cable portions 42 are bent in a completely reversed direction by means of pulleys 51 and 52 mounted on ball-bearing horizontal shafts 53 and 54 supported on pairs of poles secured to the upper bolster 3 and the intermediate bolster 7 secured to the posts 1 and 2 of the upright corresponding to the lowest portion of the beams 5—6.

Then, said cable portions 42 are guided towards beneath the truck 11 by means of two pulleys 55 and 56 mounted by ball bearings on horizontal shafts 57 and 58 supported on two pairs of bolsters 59 and 60 secured to the frame of the truck 11, and then about two pulleys mounted through ball bearings 61 on a horizontal shaft 62 carried by the frame 14 on triangular pieces 63 secured to the ends thereof; then said cable portions 42 again extend upwardly to the truck 11 to be bent in a horizontal direction by two pulleys 64 and 64' mounted through ball bearings on horizontal shafts 65 and 66 supported on the pairs of bolsters 59 and 60 secured on the frame of the truck 11, and said cable portions 42 are then bent downwardly and outwardly the framework of the hoisting device by means of two pulleys 67 and 68 mounted through ball bearings on horizontal shafts 69 and 70 supported on the two pairs of vertical poles 22—23, 24—25 at the other end of the framework, whereat the two portions of cable 42 are joined together by an intermediate portion thereof. Said intermediate portion forms a downward incidence angle upon passing through and being retained by the eye of a shackle bolt 71 which is connected through a knife edge bar 72 with the lever of dissimilar arms 73 joined to a weighing scale installed within a casing 74 situated on the angular bolster 4 that inferiorly joins together the posts 1 and 2 of the upright immediate the driving wheel 37.

Said lever 73 rests through the knife edge bar 75 on the eye of an eyebolt 76 secured by its lower end to the angular bolster 4, while the end of the longer arm of lever 73 is connected through a knife edge bar 77 and a double-eye eyebolt 78 with the knife edge bar 79 secured to the scale lever 80 hanged from the top portion of the casing 74 through the eyebolt 81 and knife edge bar 82. The graduation of lever 80 is marked on the plates 83 and 84 forming the longest arm of lever 80 and on which the movable weights 85 and 86 are adapted to slide, said lever 80 having at its ends eyebolts 87 and 88 respectively supporting the dish 89 and weights 90, and said dish 89 being adapted to support the weights that will determine the weight of each sugar cane load 13.

The operation of the described hoisting device is as follows: Assuming that truck 11 is maintained in vertical position over the place occupied by the cart 16, the brake 28 is pressed through lever 29 to hold the truck 11, and the frame 14 is lowered upon the cart 16 preparatory to hanging up through slings 15 the load of sugar cane 13 in the cart 16, to which end it will be sufficient to loosen the brake 39 of vertical wheel 37 by means of the hand lever 40. Once the slings 15 are attached to the sugar cane load 13, the frame 14 will be raised by operating the wheel 37 by means of any suitable source of power, whereupon the end portions of cable 42 will be wound about drums 43 and 44.

The weight of the load will immediately be registered on the scale, by reason of the fact that the weight of the load 13 is automatically transmitted by the tension of cable 42 to the shackle bolt 71 secured to the scale lever 73, and as long as the truck 11 retains the load 13 in suspension in any position of the truck on the slide track 9—10, the weight will be registered on the scale. It is then desired to traverse the load so that it will be directly over the railway car 17. This can be done by loosening the brake 28 which holds the truck 11 in immovable position, whereupon the gravity action of the weight of load 13 will cause the truck to move on the slide track 9—10 towards the lower end of the latter until it is stopped by stops 19, and then upon releasing the brake 39 of driving wheel 37, the frame 14 will be caused by the weight of load 13 to automatically descend until it is directly over the railway car 17. Once the slings 15 are released, the frame 14 is again raised by operating the shaft 36 of the driving wheel 37, whereupon the truck 11 will automatically move back to its original position adjacent the stops 18, in virtue of the action of the weight 26 which upon being freed from friction of brake 28 on the pulley 27 will drop and carry along with it the truck 11 which will thus be in position for hanging up a next sugar cane load in another cart placed beneath the conveying device.

As it is seen, the operation of this combined conveying and weighing device is most simple, the hoisting and releasing operations of the sugar cane load 13 depending upon a single cable 42 which is permanently connected at an intermediate point thereof to the lever of dissimilar arms which forms part of the weighing mechanism and which immediately transmits the weight of the load to the graduated scale, and once the truck 11 has discharged the sugar cane load 13, the same will automatically move to its original position upon the action of the weight 26, whereas when the sugar cane load 13 is hoisted, the truck 11 will automatically move to the lower end of the slide track 9—10 in virtue of the inclination of the latter towards the side at which is positioned the railway car 17 to which the load is to be transferred.

It is obvious that changes may be made in the construction details of the conveyor and the weighing mechanism, without thereby altering the essential character of the invention, which is such as claimed hereinafter.

What I claim is:

1. In a combined hoisting and weighing device, the combination with a supporting framework comprising two slightly inclined beams and end upright members supporting the ends of said inclined beams, a track on said inclined beams, and a truck movable on said track and provided with two pairs of pulleys, of driving means comprising a horizontal driving shaft rotatably supported on braces fixed at their lower ends to the ground and at their upper ends to the inclined beams adjacent the higher end upright member, a driving wheel keyed to the central portion of said shaft, and a pair of drums keyed to said shaft at each side of said driving wheel, a pair of ball-bearing pulleys idly supported at the upper portion of the higher end upright member, a pair of ball-bearing pulleys idly supported at the upper portion of the lower end upright member, a load suspension frame carrying two ball-bearing pulleys idly supporting thereon, a weighing scale in front of the driving means and near them, and a single load suspension cable the end portions of which are wound about said drums respectively and extend upwardly around the ball-bearing pulleys supported on the higher end upright member of said framework and pass from one end to the other end of the supporting framework across the truck and are then reversed in an opposite direction by the pulleys supported at the upper portion of the lower end upright member of the framework to be guided to beneath the truck by passing around the pulleys of the truck to pass around the pulleys of the load suspension frame, said single cable forming at its middle portion a downwardly incidence angle suitably connected to the beam of the weighing scale, whereby as the load is hoisted and kept in suspension from said cable the weight of the load will be registered on the weighing scale in any position of the truck carrying the load suspension frame.

2. In a combined hoisting and weighing device, the combination with a supporting framework comprising two slightly inclined beams and end upright members of unequal height supporting the ends of said inclined beams, a track on said inclined beams, and a truck movable on said track and provided with two pairs of ball-bearing pulleys, of driving means comprising a horizontal driving shaft rotatably supported on braces fixed at their lower ends to the ground and at their upper ends to the inclined beams near the higher end upright member of said supporting framework, a driving wheel keyed to the central portion of said shaft, and a pair of drums keyed to said shaft at each side of said driving wheel, a pair of ball-bearing pulleys idly supported at the upper portion of the higher end upright member, a pair of ball-bearing pulleys idly supported at the upper portion of the lower end upright member, a load suspension frame carrying two ball-bearing pulleys idly supported thereon, a weighing scale the casing of which is secured to the base of higher end upright member in front of the driving means and provided with a shackle bolt secured to the shorter arm of its beam and raising upwards from it, and a single load suspension cable the end portions of which are wound about said drums respectively and extended upwardly around the ball-bearing pulleys supported on the higher end upright member of said framework and pass from one end to the other end of the supporting framework across the truck and are then reversed in an opposite direction by the pulleys supported at the upper portion of the lower end upright member of the framework to be guided towards beneath the truck by passing around the pulleys of the truck to pass around the pulleys of the load suspension frame, said single cable forming at its middle portion a downwardly incidence angle at the apex of which is connected to the weighing scale by passing through the eye of the shackle bolt raising from the weighing scale beam, whereby as the load is raised and kept in suspension from said single cable the weight of the load will be registered on the weighing scale, in any position of the truck carrying the load suspension frame.

AVELINO FERNÁNDEZ LLANUSA.

References Cited in the file of this patent

UNITED STATES PATENTS

| Number | Name | Date |
|---|---|---|
| 535,219 | McDowell et al. | Mar. 5, 1895 |
| 1,391,411 | Roces | Sept. 20, 1921 |
| 1,467,013 | Rodriguez | Sept. 4, 1923 |
| 1,922,176 | Ruhland | Aug. 15, 1933 |